United States Patent [19]

MaCall et al.

[11] 4,121,459
[45] Oct. 24, 1978

[54] TEMPERATURE PROFILE MEASURING DEVICES

[76] Inventors: Thomas F. MaCall, 1720 Whitham Ave., Los Altos, Calif. 94022; Conrad A. Parlanti, 699 Towle Way, Palo Alto, Calif. 94306

[21] Appl. No.: 667,843

[22] Filed: Mar. 17, 1976

[51] Int. Cl.² .......................................... G01J 5/10
[52] U.S. Cl. .............................. 73/340; 73/355 R; 250/349
[58] Field of Search ............ 73/340, 355 R; 250/349; 340/227, 228, 378 R, 11

[56] References Cited

U.S. PATENT DOCUMENTS

| | | | |
|---|---|---|---|
| 3,749,823 | 7/1973 | Warner | 73/355 |
| 3,861,458 | 1/1975 | Ostrander et al. | 250/349 X |
| 3,927,571 | 12/1975 | Athey | 73/362 |
| 3,946,364 | 3/1976 | Codomo et al. | 73/340 |

Primary Examiner—Herbert Goldstein
Attorney, Agent, or Firm—Michael L. Harrison

[57] ABSTRACT

Temperature profiles of objects having large areas are measured and displayed by providing a plurality of radiometric sensors, each sensor having an established field of view and being directed toward the object whose temperature is being measured. Outputs of the sensors are processed to provide maximum sensitivity within a specified temperature range and little or no sensitivity outside of the specified range. Within a specified temperature range the temperature scale is divided into a number of increments, the number of said increments dependent on the desired degree of resolution of measurement. The processed and expanded output of each of the radiometric sensors is electronically compared and categorized into the selected divisions of the specified temperature range. Electrical signals derived from this comparison are provided to columnar displays associated with each radiometric sensor whereby the range of temperature is displayed and the output of each radiometric sensor is indicated. Location of the various elements of the display adjacently provides an indication of the profile of the temperature of the object being measured. The apparatus may also be employed for quantitative temperature measurements by calibrating the expanded temperature scales against known standards.

3 Claims, 4 Drawing Figures

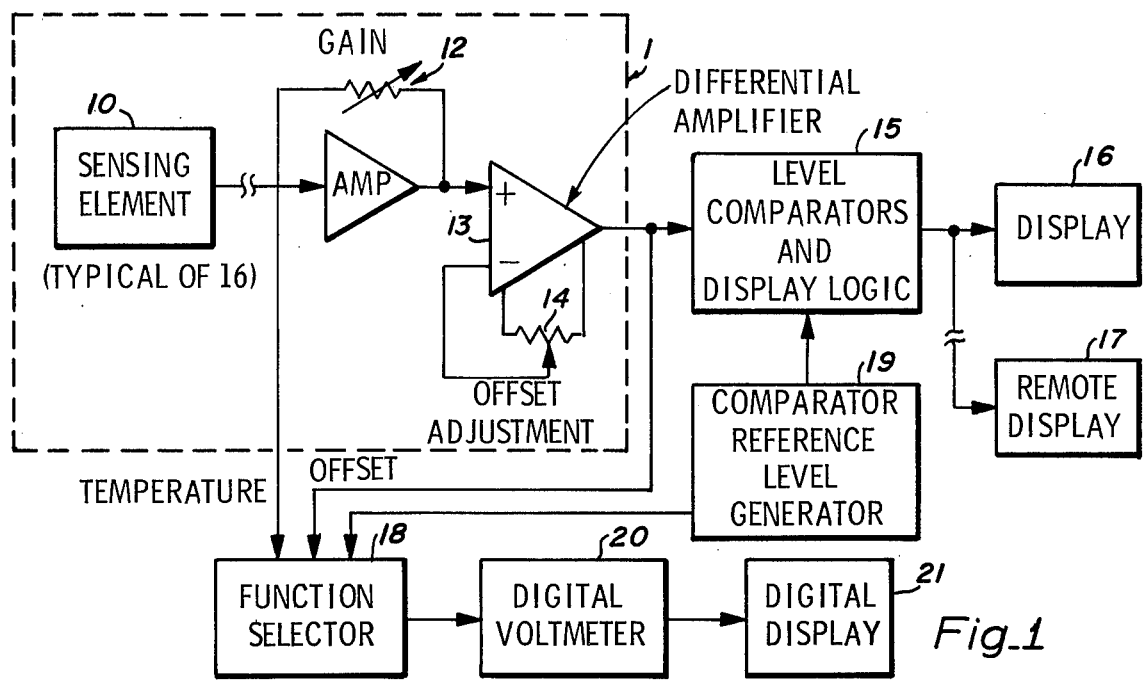
Fig_1
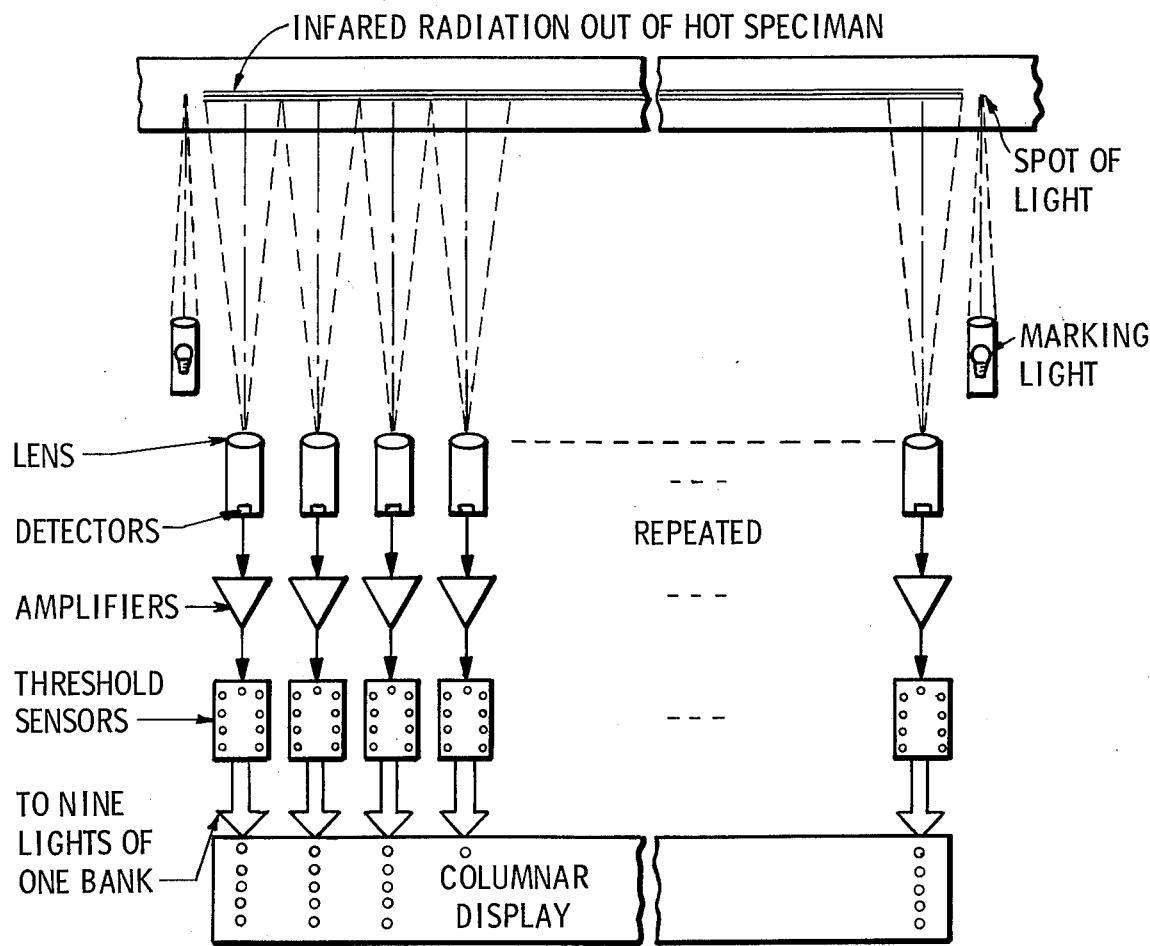
Fig_4

TEMPERATURE PROFILE MEASURING DEVICES

FIELD OF THE INVENTION

The present invention relates to temperature measurement and display apparatus and particularly to apparatus for measuring the temperature of hot bodies without contact being made between the sensor and the object being measured.

BACKGROUND OF THE INVENTION

The need exists for apparatus capable of accurate temperature measurement and display in environments which are hostile to measurement apparatus, or which are not amenable to instrumentation because they are moving or inaccessible. In a number of industrial processes it is important to measure the temperature of the material being processed, in both absolute and relative terms, and to be able to display the measured values in a way which is immediately useful to operators for purposes of warning and fault correction.

In the past, thermocouples, thermoplies, thermally-sensitive resistors, semiconductor junctions and similar devices have been employed, in contact with the measured object, to measure temperatures in a variety of applications. The use of such devices suffers from the drawback that physical attachment to or immersion in the object or substance being measured is required. While many applications do not suffer other than inconvenience from this requirement, in other applications it is necessary to abandon the attempt to measure temperature unless a non-contacting temperature sensor can be employed.

In the field of industrial process controls, the inability to measure the temperature of many continuous motion processes without first bringing the process to a halt is a major cause of waste of time, material and capital.

For example, in coated paper manufacturing processes, it is desirable to measure the temperature of the paper as it moves from one point to another. Since the paper is manufactured in a continuous ribbon, and is moving at relatively high speeds, access to the paper for measurement and quality control purposes is problematic. At the same time, if waste is to be avoided, the temperature of the paper must be known at various states of the process. In the coating process, molten coating material is applied continuously to the moving base paper. If the temperature of the paper base and coating material combination is too high at the time of application, the coating material penetrates too deeply causing the surfaces of the paper to be rough. On the other hand, if the coating material is too cold, the coating becomes too thick and, consequently, wasteful of materials. In extreme cases, the coating will not bond the base material if it is applied at temperatures which are too cold. Accordingly, it is necessary to precisely measure the temperature of the paper as it is being coated in order to determine whether the process is within acceptable temperature limits. Generally, it is not the average temperature of a segment of the paper which is determinative of its quality, rather it is the temperature of a small section or spot. The temperature of small spots of abnormally high or low temperatures may be indicative of satisfactory or unsatisfactory processing of an entire production batch. Detection of a spot having abnormal temperature is difficult with average reading temperature measuring equipment but failure to detect abnormalities and to correct the process is extremely costly. Entire batches are frequently rendered unuseable due to the inability of existing equipment to make this measurement.

Remote measurement of the moving paper ribbon is evidently required since attachment of a temperature transducer is not possible. However, equipment for remote temperature measurement having sufficiently fast response times and capable of covering an area as large as that required for paper manufacturing, while still being capable of detecting small segments of anomolous temperatures, has heretofore not been available.

Similar problems exist in processing of plastic films, tapes, foils and other laminar or ribbon-shaped materials.

A somewhat different application exists in the metal refining industry. In refining metals by process of electrolysis, vast areas of tanks containing a metal bearing electrolyte and cathode and anode plates are employed. The plates are series or parallel connected together, immersed in the electrolyte, and a current is passed through the plates resulting in electrolytic deposition of refined metal on the plates. Many pairs of plates are employed in each electrolyte bath. Malfunction of the plates by shorting together in common and highly costly since not only is the refinement process terminated at shorted plates, but power is dissipated and energy consumed without benefit being realized. The obvious difficulty in detecting and correcting malfunctions is that, short of electrical testing performed on each set of plates, a time-consuming and costly process which requires shutdown of a complete tank, no effective way presently exists for determining which plates are malfunctioning. Since many pairs of plates exist within one tank, instrumentation of each plate pair is impractical. However, the performance of each tank is reflected in the temperatures which are produced by the process and, given the proper apparatus, a survey of temperature can quickly locate the bath in which malfunctioning plates are present by detecting an anamolous average temperature. Since many factors such as ambient temperature, current supplied and electrolyte condition affect the temperature of the electrolyte bath, a measurement of absolute temperature will not be dispositive as to the presence or absence of abnormalities in any given tank. However, determination of comparative or relative temperatures followed by isolation of those tanks which display a significant deviation from the norm will quickly lead to the malfunctioning tank. Further isolation of the malfunction down to the level of individual plate pairs can then be accomplished.

Malfunctioning shorted plates within the electrolyte bath are reflected in a lower than normal temperature in their immediate vicinity in the case of series-connected plates, and higher than normal temperatures in their immediate vicinity in the case of parallel-connected plates. A radiometric sensor having sufficiently fine temperature resolution can provide isolation of the malfunctioning plates by simply interdicting a thermal isolator between each plate pair and the radiometer and noting the change in average apparent bath temperature as each plate pair's contribution is removed from the average. Normally functioning plates will, of course, have similar temperatures and will have similar effects when their contributions are removed from the radiometer's field of view. Malfunctioning plates will, on the other hand, have an abnormal effect on the apparent average bath temperature and therefore may be readily isolated. Use of the same apparatus is possible for both isolation of tanks containing malfunctioning plates and isolation of individual plate pairs within the bath if the apparatus is capable of sufficiently fine resolution of temperatures within a given temperature range, and simultaneous display and comparison of a multiplicity of sensor inputs due to the need for locating one sensor at each electrolyte bath and for the need to make comparative as well as absolute temperature measurements.

SUMMARY OF THE PRESENT INVENTION

Accordingly, it is an object of the present invention to provide an apparatus with which the temperature of large areas may be measured and displayed with high resolution.

It is another object of the present invention to provide an apparatus with which temperature profiles may be measured and displayed.

It is still another object of the present invention to provide an apparatus with which rapidly fluctuating temperatures can be measured and displayed.

It is yet still another object of the present invention to provide an apparatus capable of measuring and displaying the temperatures of objects without contact being made with the object.

It is a further object of the present invention to provide an apparatus for making comparative temperature measurements for a number of differed objects.

Briefly, the present invention accomplishes these and other objects by providing an array of infrared radiometric sensors having a known and pre-established field of view each providing a current analog of infrared radiation to an adjustable gain amplifier which in turn feeds a logic array by which level comparison and display controls are produced and which, itself in turn, drives an array of light emitting diodes which are illuminated in correspondence with the temperatures sensed by the radiometic sensors. A vertical row of light emitting diodes is provided for each sensor and adjacent vertical rows are arranged such that each vertical position of each row corresponds to a particular temperature. Infrared radiation incident upon the infrared radiometer causes current to flow in the detector element in inverse proportion to the wavelength of the infrared radiation. By adjusting gain and comparator levels, the display may be calibrated to encompass a wide range of input temperatures.

BRIEF DESCRIPTION OF THE DRAWINGS

FIG. 1 is a circuit block diagram showing the general circuit arrangement of the present invention and one channel of sensor/amplifier.

FIG. 4 depicts the use of the present invention for process control in measuring the temperature of a moving ribbon of material.

DESCRIPTION OF THE PREFERRED EMBODIMENT

Figure 2:
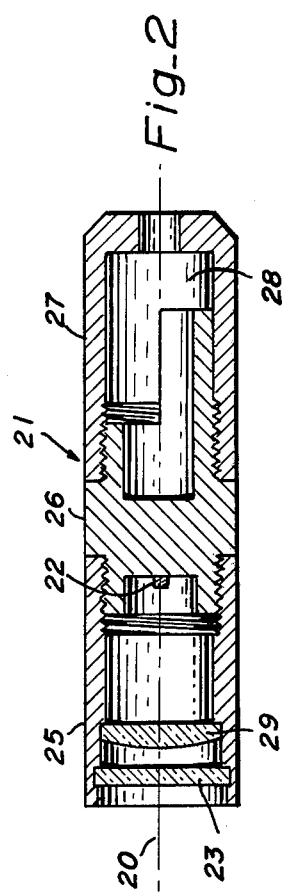
FIG. 2 is a cross sectional drawing of a sensor element.

Referring now to FIG. 1, there is shown a 16 channel version of the preferred embodiment of the present invention. The input section 1 is shown enclosed in dotted lines and is typical of 16 identical circuits. Each input section comprises a radiometric sensor 10, a high-gain amplifier 11, a gain adjustment potentiometer 12 located in the feedback loop of the amplifier 11, a mixer 13 and an offset adjustment 14, cooperating with mixer 13.

Portions of the invention which are common to all embodiments include the level comparators and display logic 15, the comparator reference level generator 19 and the display 16.

In many applications it will be desirable to include a digital voltmeter 20, a digital display 21 cooperating with the digital voltmeter 20, a function selector 18 selecting input sources for the digital voltmeter 20 and a remote display 17.

Referring now to FIG. 2, there is shown a cross-sectional view of a radiometric sensor unit comprising a body 21, a sensing element 22, a saphire window 23 and an infrared focusing lense 24. The body 21 is made in three sections 25, 26 and 27 for convenience in manufacturing, testing and repair, and is provided with a housing 29 for active circuitry if so desired. In general, it is preferred to install the first stage of amplification, amplifier 11 of FIG. 1, within the sensor housing in order to include the amplifier in the same temperature environment as the sensing element. This allows temperature compensation, if required, for the two elements to be accomplished as if they were a single element. A second equally important advantage is that ambient electrical noise down not so readily intrude in the sensing element-to-amplifier interwiring if they are located in close proximity to one another inside the shielding offered by the metallic body 21 of the sensor. For most industrial applications, this advantage alone will justify making the sensor and first amplifier stage an integral arrangement.

The saphire window 23 is employed for several reasons. It is required that the lens 24 be made from an infrared transparent material such as saphire. Saphire is, in fact, the ideal material from the standpoint of infrared performance, and thermal and mechanical ruggedness. Unfortunately, it is prohibitively expensive to make a lens from it. Flat plates, however, are must less expensive and so are chosen in the preferred embodiment as a barrier to mechanical and chemical damage. A less rugged, cheaper, brittle substance can then be employed for the lens since it is protected by the saphire window.

An infrared lens 24 is employed to control the field of view of the sensor and to improve its sensitivity by gathering energy and concentrating it on the sensing element 21. The lens is ground to perform at its optimum for wavelength in the infrared spectrum and is manufactured from material, such as calcium fluoride, which has minimum absorbtion at infrared wavelengths.

The sensing element 22 is located at the focal point of the lens 24, preferably in close thermal contact with the body 21 and the amplifier, if any, located in the housing 29 portion of the body. Sensing elements of a variety of materials are useable including, among others, lead sulphide, lead selinide, and mercury-doped germanium. The preferred materials will depend upon the temperature range required, the cost objectives and whether photoconductive or photovoltaic operation is desired.

The output of the radiometric sensor element 10 is applied directly to the inverting signal input of amplifier 11. The amplifier is shown as being operated in a current-to-voltage mode, corresponding to a photovoltaic sensor element, which is accomplished by routing a feedback signal from the output of the amplifier to the inverting signal input. To maintain input equilibrium, the output voltage of the amplifier thus becomes an analog of input current by a conversion factor equal to the value of the feedback resistor 12. The feedback resistor is made variable in the present invention to allow for variations in amplifier gain and sensing element sensitivity. It is desirable to provide this adjustment as early as possible in the chain so that standardized signals are available for processing throughout the remainder of the circuit.

While the output of the sensor element is linearly proportional to the total radiant power which is incident upon it, it is non-linearly proportional to the temperature of the source of that power. Therefore, for those applications which require a linear rendition of temperature, it will be desirable to lineraize the output of amplifier 11 by employing a logarithmic amplifier or multiplier.

It can be readily seen that the output of amplifier 11 is a voltage analog of the temperature of the object at which the sensor 20 is aimed. The voltage at the output of amplifier 11 is next applied to the non-inverting input of a differential amplifier 13. The inverting input of this amplifier is referred to a precisely regulated offset voltage which is preselected to establish the lower limit of the temperature range over which it is desired for the apparatus to measure temperature. The output of the amplifier is zero, or a nominal quiescent output, for temperatures which are below the lower temperature limit established by the offset voltage input to the differential amplifier, while for temperatures which exceed the lower temperature limit, the output voltage increases proportionally to the amount by which the actual temperature of the object being measured exceeds the preselected lower temperature limit established by the offset voltage.

The output of the differential amplifier is itself an analog of the measured temperature but the range of the analog is expanded so that only the range of temperatures above the lower temperature limit will produce an output. The scale factor of the analog voltage thus generated may be varied by varying the gain of the differential amplifier. As lower gains are selected, the average volts per degree slope of the differential amplifier transfer curve is lowered, while for higher gains the average volts per degree slope is lowered.

Thus, a segment of temperature range may be selected by selection of the proper offset voltage and may be expanded by selection of the proper differential amplifier gain.

The voltage analog of temperature which results at the output of the differential amplifier is next applied to an array of level comparators. For the preferred embodiment being described, there are nine comparators for each sensor channel. Within each group of nine comparators, unique reference voltages are applied to the inverting input of each comparator. Identical voltages are applied by parallel connections to each of the other 15 groups of nine. The analog voltage produced by each channel's input section at the output of differential amplifier 13 is applied to the non-inverting input of all nine comparators within a single group of nine so that for each channel's input section at the output of differential amplifier 13 is applied to the non-inverting input of all nine comparators within a single group of nine so that for each channel's grouping, of sensor 10, amplifier 11 and differential amplifier 13, there exists a corresponding grouping of nine comparators.

The reference voltages applied to each comparator group are standardized to take advantage of the maximum useable dynamic range of the differential amplifier output in combination with the comparator input. Each comparator's output is a logical "0" for analog voltages below the reference voltage applied to each inverting input and is a logical "1" for voltages greater than the threshold. By determining the outputs which are "0" and which are "1", a logical decision can be made as to which of the reference voltages the analog output falls between. Since each reference voltage in turn is preselected to correspond to a segment of the temperature scale, it follows that it can be determined by analyzing the comparator states whether the temperature of the object being measured falls between two pre-established limits.

By adjusting of scale factor, the significance of the intervals between reference voltages can also be altered to suit a particular requirement while by altering the lower temperature limit offset the temperature at which the lowest reference voltage is matched and exceeded may also be varied. Thus, both resolution and range may be varied to accommodate differing requirements for differing applications.

It will be appreciated that the output of the comparators can be employed for a variety of purposes including activation of alarms, controllers and displays, as is well known to those skilled in the art of digital logic circuitry.

Figure 3:
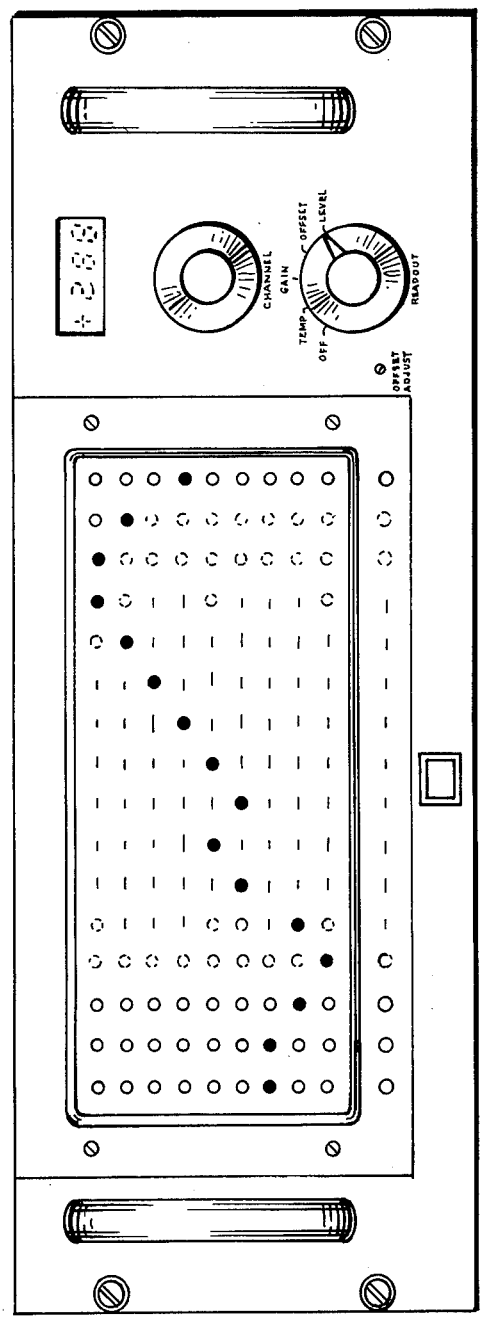
FIG. 3 depicts the display arrangement for a sixteen channel version of the present invention.

Outputs of the comparators in the preferred embodiment are applied to a display logic circuit 16, in groups of nine. The display logic circuitry contains 16 nine-input decoding matrices which determine which reference voltage level the analog voltage from amplifier 13 exceeds and, by correspondence, what temperature is being sensed by each of 16 sensors. The outputs of the matrix are 16 nine-line groups. Within each group, a single line is activated corresponding to the temperature segment within which the temperature of the object being sensed by the input channel corresponding to that group. For each channel, an array of light elements, preferably light-emitting diodes for immediate logic compatibility, is provided in a vertical row of nine lights per channel. For the 16 channel version of the preferred embodiment, 16 vertical columns of nine lights each are employed as shown in FIG. 3. The side-by-side arrangement of the lights is significant from the standpoint that the outputs of all channels are readily compared. In many process control applications the need exists for rapid determination of abnormalities by an operator. This goal is realized in the present invention by providing a unique color scheme within the vertical columns. The nominal values of temperature are contained within the center of the nine lights, i.e., at the fifth position from either end. For easy reference, this position is assigned the color green. Below and above this value, the lights are assigned the color yellow. Thus, at a glance, the operator can verify that input conditions are nominal, corresponding to all green lights or that some input conditions are beyond nominal values, corresponding to the presence of some yellow light. Having ascertained that some input conditions are beyond nominal values, the operator can readily observe whether the non-nominal input conditions are slightly out of nominal range or grossly out of nominal range by observing how many positions away from the center one the yellow light is activated. Since both position and color have significance to an operator, the display may be employed under varying light conditions and at varying distances from the user's position in reliance on the fact that the ability to ascertain position is attenuated at great distances from a display while color anomolies may still be readily perceived. In deciding whether further investigation is required, the operator needs merely to ascertain whether abnormal conditions are indicated by the color of the display alone. Rapid reaction to processing abnormalities is thereby facilitated without requiring undue concentration upon the display by an operator.

What is claimed is:

1. An apparatus for measuring and displaying the temperature profile of large areas comprising:
    A. a plurality of input channels each channel including
        (a) a radiometric sensor having a sensing element, a lens, and having an established field of view determined by the lens and the geometry of the sensing element in relation to the lens;
        (b) a high-gain, feedback-stabilized amplifier connected to, and responsive to signals from, the sensing element;
        (c) a differential amplifier having an output, a reference input, and an unknown input which is connected to the output of the high-gain amplifier;
        (d) a group of voltage comparators, each comparator having a reference input, an unknown input, and an output, said output having two defined operational states designated as a logic "1" and a logic "0" respectively, the logic "1" state corresponding to the condition in which a voltage applied to the unknown input exceeds a reference voltage applied to the reference input, and the logic "0" state corresponding to the condition in which a voltage applied to the unknown input does not exceed a reference voltage applied to the reference input, each comparator within the group having an assigned threshold value and being arranged in accordance with progressively increasing threshold values;
        (e) a digital logic decoder array having inputs compatible with the "1" and "0" states of the comparator outputs, said inputs being connected to and responsive to the comparator outputs, said decoder array also having outputs corresponding to the number of permissible states of the comparator group outputs, for decoding the logic states of the comparator group to provide activation of a single output of the decoder array for each unique state of the comparator group outputs;
    B. a plurality of reference voltage generators equal in number to the plurality of comparators within a group of comparators, each reference voltage generator having an output, said outputs having progressively increasing voltages, each output being connected to the reference input of a single comparator within every comparator group in accordance with the assigned threshold values of the comparator within the comparator group; and,
    C. an array of visual indicators arranged into a plurality of linear columns, said plurality corresponding to the number of input channels, each column including a group of indicators, said group corresponding to the number of outputs of each digital logic decoder array and responsive to activated outputs from said array, one indicator of each group denominated a nominal condition indicator positioned within each group at a location such that when defined nominal conditions are present at the inputs of the comparator associated with a given group the nominal condition indicator is activated, said indicator also having a unique color and all other indicators within a group having a contrasting color, said columns arranged adjacently to one another and said groups within each column arranged in accordance with the progressively increasing order of significance of the comparator output states to which they correspond.

2. An apparatus for measuring the temperature profile of large areas comprising:
    A. a plurality of input channels each channel including
        (a) a radiometric sensor having an established field of view; a preamplifier connected to and responsive to signals from the radiometric sensor;
        (b) a differential amplifier having an output, a reference input, and an unknown input which is connected to the output of the preamplifier;
        (c) a group of voltage comparators each comparator having a reference input and an unknown input and an output and each comparator within the group having an assigned threshold value and being arranged in accordance with progressively increasing threshold values;
        (d) a digital logic decoder array having inputs compatible with the comparator outputs, said inputs being connected to and responsive to the comparator outputs, said decoder array also having outputs corresponding to the number of permissible states of the comparator group outputs for decoding the logic states of the comparator groups to provide activation of a single output of the decoder array for each unique state of the comparator group outputs;
    B. a plurality of reference voltage generators equal in number to the plurality of comparators within a group of comparators, each reference voltage generator having an output, said outputs having progressively increasing voltages, each output being connected to a single comparator within every comparator group in accordance with the progressive increase in assigned threshold values of each comparator within a comparator group; and,
    C. an array of visual indicators arranged into a plurality of linear columns, said plurality corresponding to the number of input channels, each column including a group of indicators, said group corresponding to the number of outputs of each digital logic decoder array and responsive to activated outputs from said array, one indicator of each group denominated a nominal condition indicator positioned within each group at a location such that when defined nominal conditions are present at the inputs of the comparator associated with a given group the nominal condition indicator is activated, said indicator also having a unique color and all other indicators within a group having a contrasting color, said columns arranged adjacently to one another and said groups within each column arranged in accordance with the progressively increasing order of significance of the comparator output states to which they correspond.

3. An apparatus for measuring the temperature profile of large areas comprising:

A. a plurality of input channels each channel including
  (a) radiometric sensor means;
  (b) amplifier means responsive to and connected to said radiometric sensor means;
  (c) differential amplifier means, said amplifier means having an output, a reference input, and an unknown input which is connected to the output of said amplifier means;
  (d) a group of voltage comparators having reference inputs and unknown inputs compatible with and responsive to the outputs of the differential amplifier and having assigned threshold values and being arranged in accordance with progressively increasing threshold values;
  (e) digital logic decoder means for decoding the logic state of the comparator group to provide activation of a single output of the decoder means for each unique state of the comparator group outputs;
B. Reference voltage generator means having a plurality of outputs, said outputs having progressively increasing voltages for providing reference voltage inputs to the comparators in said comparator groups in accordance with the assigned threshold values of each comparator within said comparator group; and,
C. Visual indicator means having a plurality of linear columns, said plurality corresponding to the number of input channels, each column including indicator means, said indicator means corresponding to the number of outputs of the digital logic decoder means and responsive to activated outputs from said decoder means, one indicator of each group denominated a nominal condition indicator positioned within each group at a location such that when defined nominal conditions are present at the inputs of the comparator associated with a given group the nominal condition indicator is activated, said indicator also having a unique color and all other indicators within a group having a contrasting color, said columns adjacently arranged to one another and said groups of indicators within each column arranged in accordance with the progressively increasing order of significance of the comparator output states to which they correspond.

* * * * *